United States Patent
Larsson

(10) Patent No.: US 7,627,048 B2
(45) Date of Patent: Dec. 1, 2009

(54) COMMUNICATION OF INTERFERENCE MITIGATION RELATED INFORMATION BETWEEN WIRELESS DEVICES

(75) Inventor: Torbjorn A. Larsson, San Diego, CA (US)

(73) Assignee: Staccato Communications, Inc., San Diego, CA (US)

( * ) Notice: Subject to any disclaimer, the term of this patent is extended or adjusted under 35 U.S.C. 154(b) by 582 days.

(21) Appl. No.: 11/359,883

(22) Filed: Feb. 22, 2006

(65) Prior Publication Data

US 2006/0188003 A1    Aug. 24, 2006

Related U.S. Application Data

(60) Provisional application No. 60/655,721, filed on Feb. 22, 2005, provisional application No. 60/657,280, filed on Feb. 28, 2005, provisional application No. 60/661,082, filed on Mar. 11, 2005.

(51) Int. Cl.
*H04L 27/28* (2006.01)

(52) U.S. Cl. .................................................. 375/260
(58) Field of Classification Search ............... 375/260, 375/130, 267, 299, 284, 285; 370/277; 455/435.1, 455/307
See application file for complete search history.

(56) References Cited

U.S. PATENT DOCUMENTS

| | | | |
|---|---|---|---|
| 7,263,333 B2 * | 8/2007 | Roberts | 455/67.13 |
| 2002/0150187 A1 | 10/2002 | Chugg et al. | |
| 2003/0120809 A1 | 6/2003 | Bellur et al. | |
| 2003/0128787 A1 | 7/2003 | Terasawa et al. | |
| 2004/0001530 A1 | 1/2004 | Lyle et al. | |
| 2005/0013387 A1 | 1/2005 | Ojard | |
| 2005/0042999 A1 * | 2/2005 | Rappaport | 455/307 |
| 2006/0160536 A1 * | 7/2006 | Chou | 455/435.1 |

* cited by examiner

*Primary Examiner*—Khai Tran
(74) *Attorney, Agent, or Firm*—Van Pelt, Yi & James LLP

(57) ABSTRACT

Transmitting information is disclosed. Interference mitigation information associated with mitigating interference with a victim wireless device is obtained. The interference mitigation information is transmitted.

22 Claims, 13 Drawing Sheets

/ 800

| Originator of information | Number of hops | Detection period | Frequency of detection | Threshold parameters |
|---|---|---|---|---|
| 802 — Self | 0 | Data reservation 10 | Every superframe | Signal strength, number of times, period of occurrence |
| 804 — Device A | 1 | 100mS beginning at time $t_0$ | Every 5 S | Signal to noise ratio |

| Originator of information | Time of Detection | Number of hops | Signal strength | Spectrum of detected signal |
|---|---|---|---|---|
| 832 — Self | 6,000 clock cycle | 0 | 6 dB | Band 2, Subcarriers 1 thru 5 |
| 834 — Device A | 7,500 clock cycle | 1 | -3 dB | Band 11, Subcarriers -34 thru -32 |

| Originator of information | Number of hops | Band | Lining subcarriers | Notch subcarriers |
|---|---|---|---|---|
| 862 — Self | 0 | 2<br>11 | 0, 5<br>N/A | 1 thru 4<br>-34 thru -32 |
| 864 — Device A | 1 | 11<br>2 | -35, -31<br>0, 6 | -34 thru -32<br>1 thru 5 |

COMMUNICATION OF INTERFERENCE MITIGATION RELATED INFORMATION BETWEEN WIRELESS DEVICES

CROSS REFERENCE TO OTHER APPLICATIONS

This application claims priority to U.S. Provisional Patent Application No. 60/655,721 entitled CENTRALIZED INTERFERENCE MITIGATION CONTROL IN UWB PERSONAL AREA NETWORKS filed Feb. 22, 2005; U.S. Provisional Patent Application No. 60/657,280 entitled DISTRIBUTED INTERFERENCE MITIGATION CONTROL IN UWB PERSONAL AREA NETWORKS filed Feb. 28, 2005; U.S. Provisional Patent Application No. 60/661,082 entitled SPECTRAL NOTCH CONTROL IN WIRELESS PERSONAL AREA NETWORKS filed Mar. 11, 2005, which are incorporated herein by reference for all purposes.

BACKGROUND OF THE INVENTION

Ultra wideband (UWB) wireless devices occupy a relatively wide bandwidth that may overlap with narrowband wireless devices. In some cases, coexistence is ensured by the low power spectral density of a UWB signal compared to narrowband signals. To a narrowband receiver, a UWB signal may be indistinguishable from thermal noise in the receiver front end. However, in some situations a narrowband wireless device may be adversely affected by interference from a nearby UWB transmitter. Improved techniques to mitigate interference with a victim wireless device may be useful.

BRIEF DESCRIPTION OF THE DRAWINGS

Various embodiments of the invention are disclosed in the following detailed description and the accompanying drawings.

FIG. 8A is a table illustrating an embodiment of stored information associated with detection parameters.

FIG. 8B is a table illustrating an embodiment of information associated with detection results.

FIG. 8C is a table illustrating an embodiment of information associated with modified subcarriers.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
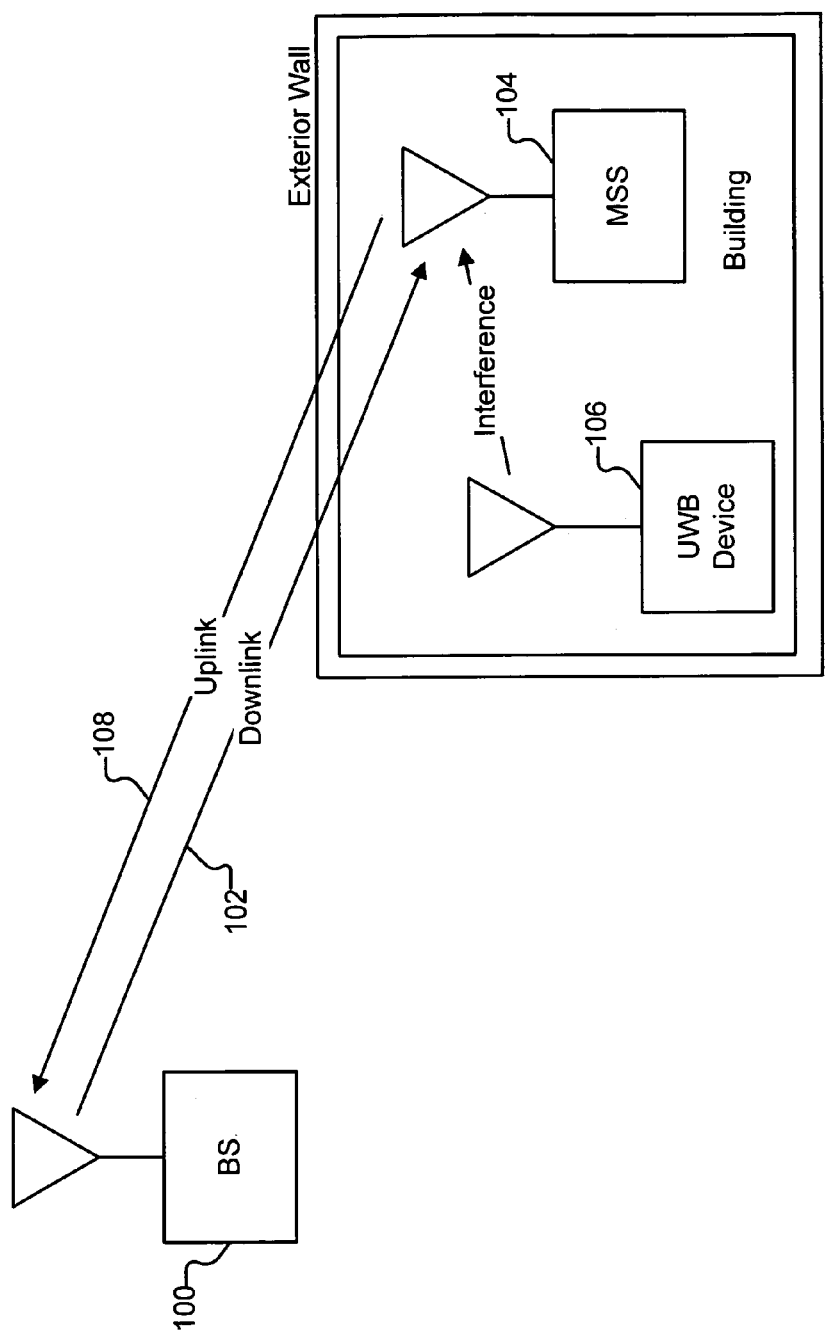
FIG. 1 is a system diagram illustrating an embodiment of a wireless device interfering with a victim wireless device.

FIG. 1 is a system diagram illustrating an embodiment of a wireless device interfering with a victim wireless device. In the example shown, UWB wireless device 106 is a member of a group of UWB wireless devices (not shown). The group of UWB wireless devices may be a Wireless Personal Area Network (WPAN). WPANs are intended for data communication over relatively short distances, perhaps on the order of a few meters. There may or may not be infrastructure associated with the group of wireless devices. For example, some members of a group of wireless devices may have access to a secondary network other than the UWB wireless network. A secondary network may be a wired network, such as a wired Ethernet or Transmission Control Protocol/Internet Protocol (TCP/IP) network.

UWB wireless device 106 and other members in a group may transmit on the same channel, which may be a specific frequency band or multiple frequency bands if band hopping is employed. The procedures used to establish and coordinate activities in a group of wireless devices may be part of the Medium Access Control (MAC) protocol layer. MAC protocols may be categorized as either centralized and distributed.

In a distributed protocol, responsibility for coordinating access to a common channel may be shared amongst the wireless devices in a group. One example of a distributed protocol is described in the WiMedia UWB specification. In the WiMedia specification, all wireless devices in a group may perform the same Medium Access Control (MAC) functions. Synchronization and coordination of activities in a group are achieved with the use of beacon frames, which are transmitted periodically by all wireless devices in a group. A wireless device may use its beacon frame to broadcast reservation and scheduling information to other devices. The timing of transmissions may be based on a superframe, an example of which is discussed in further detail below.

In a centralized protocol, one wireless device, referred to as a coordinating wireless device, may coordinate communications between wireless devices in a group. A coordinating wireless device may manage other responsibilities for the group, such as association or power save functions. Association is the procedure by which a wireless device becomes a member of a group. In a centralized protocol, all of the wireless devices in a group may be under the coordination of the coordinating wireless device to some degree. In some instances, groups using a centralized protocol may operate within range of each other. To limit the amount of mutual interference, different groups that are within range of each other may use different channels. To achieve this, a wireless device that wants to establish a new group may become a coordinating wireless device for a new group. A new coordinating wireless device may scan the set of available channels in order to find an unused channel.

Various Physical (PHY) layer technologies may be used by a wireless device. In this example, UWB wireless device 106 includes a wideband PHY layer, and Base Station (BS) 100 and Mobile Subscriber Station (MSS) 104 use a narrowband PHY layer.

In the example shown, BS 100 and MSS 104 are WiMAX wireless devices and MSS 104 is a victim wireless device. A variety of regulatory agencies around the world may allocate various frequency bands between 3.3 GHz and 3.9 GHz for broadband wireless access which may be used by WiMAX wireless devices. These bands may be on the order of 100 to 200 MHz wide. WiMAX BS 100 may transmit downlink signal 102 which is received by WiMAX MSS 104. MSS 104 is located inside a building. UWB wireless device 106 may be located in the building relatively close to MSS 104, perhaps even in the same room. If UWB wireless device 106 is close enough to MSS 104, the UWB signal may raise the noise floor sufficiently in the radio of MSS 104. Downlink signal 102 from the remote BS 100 to MSS 104 may be weak due to a significant amount of path loss (including the loss through the exterior wall), making it susceptible to noise floor variations. As a result, the downlink reception quality to the MSS may be degraded and MSS 104 is a victim wireless device. Uplink signal 108 may also be affected by UWB wireless device 106.

In order to reduce or possibly even eliminate interference with MSS 104, UWB wireless device 106 may have an interference mitigation controller. An interference mitigation controller may perform a variety of functions including, but not limited to, detecting the presence of a victim wireless device, determining an appropriate technique to avoid interfering with a victim wireless device, and implementing measures deemed appropriate to mitigate interference with detected wireless devices. For example, a transmission signal may be notched to avoid a certain frequency or transmission time may be adjusted to avoid a certain time. Interference mitigation information may be exchanged with other wireless devices to improve interference mitigation. A wireless device may use information provided by another wireless device in determining an appropriate avoidance technique and conversely may provide interference mitigation information to other wireless devices. There may be a variety of benefits associated with exchanging interference mitigation information with other wireless devices.

Some embodiments of interference mitigation controllers and associated functions are described herein, but other embodiments may be used. Some combination of or modification to the example techniques may be used. The particular technique used depends upon the particular scenario. For example, some techniques are more attractive or effective depending upon the wireless protocol used by a victim wireless device (e.g., scheduled access or contention based access to the wireless channel), the degree to which a victim wireless device is interfered with, the topography of victim/interfering wireless devices, the wireless protocol used by an interfering wireless device (e.g., distributed or centralized), a desired minimum data rate associated with an interfering/victim wireless device, or other such factors.

Figure 2:
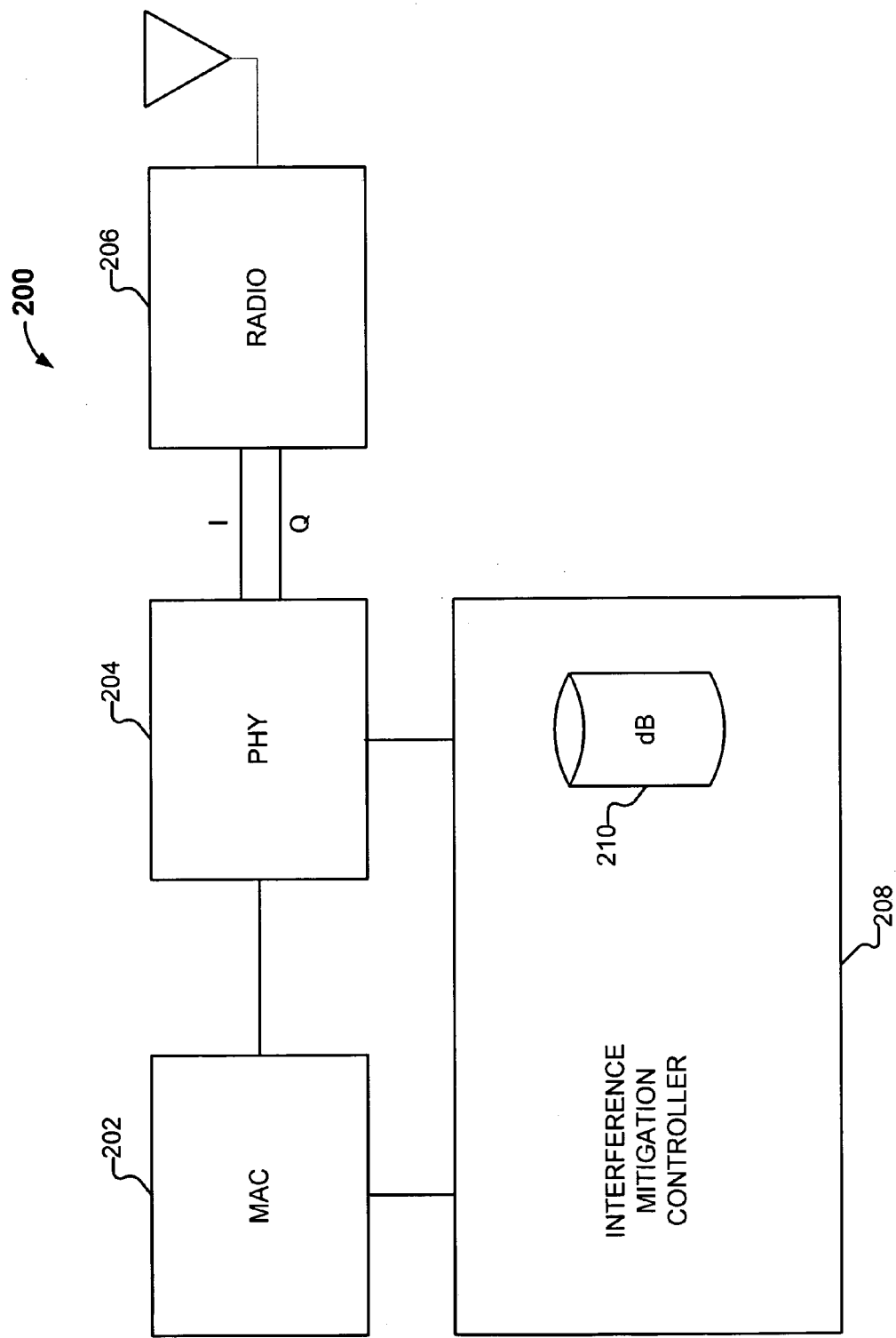
FIG. 2 is a block diagram illustrating an embodiment of a wireless device with an interference mitigation controller.

FIG. 2 is a block diagram illustrating an embodiment of a wireless device with an interference mitigation controller. In the example shown, wireless device 200 can be UWB wireless device 106, a wireless device interfering with a victim wireless device. Wireless device 200 includes MAC 202 and PHY 204. MAC 202 is associated with a MAC protocol and is responsible for access to a wireless channel. PHY 204 performs physical layer processing, such as encoding/decoding and modulating/demodulating. Radio 206 transforms baseband I and Q signals from PHY 204 to the appropriate frequency band used by wireless device 200 and vice versa. Wireless device 200 is capable of transmitting signals and receiving signals. During transmission MAC 202 passes transmit data to PHY 204, which in turn passes transmit I and Q signals to radio 206. When receiving, radio 206 passes receive I and Q signals to PHY 204, which passes receive data to MAC 202. The particular functions performed by MAC 202, PHY 204, and radio 206 may depend upon the wireless protocol performed by wireless device 200. The WiMedia UWB protocol is one example of such a wireless protocol. Other wireless protocols may be performed by wireless device 200, including the IEEE 802.15.3 protocol.

Interference mitigation controller 208 performs a variety of functions associated with interference mitigation, including, but not limited to, detecting victim wireless devices, determining an appropriate avoidance technique, and communicating that avoidance technique to the appropriate component. In some embodiments, one wireless device per group has an active interference mitigation controller. For example, if a group of wireless devices use a centralized protocol, the coordinating wireless device in the group may have an active interference mitigation controller. The other devices in the group may have inactive interference mitigation controllers, or only some portion of their interference mitigation controllers may be enabled. Alternatively, each wireless device in a group may perform interference mitigation functions for itself. For example, each wireless device in a group that uses a distributed protocol may have an active interference mitigation controller.

Interference mitigation controller 208 includes database 210. Database 210 may be used to store a variety of information associated with interference mitigation including information about protected bands and results of a detection process. Some information in database 210 may be obtained from other wireless devices. For example, another wireless device may report detected narrowband signals resulting from a detection process, and this information may be stored in database 210. Based on the results of a detection process (which may be performed by and obtained from another wireless device), interference mitigation controller 208 may determine an appropriate action to avoid a victim wireless device. Some actions include creation of a spectral notch in a transmission signal. A determined action may be stored in database 210 and may be communicated to another wireless device. For example, a wireless device may communicate to another wireless device that there is a spectral notch at a certain frequency. A variety of tables, parameters, settings, and other information may be stored in database 210.

Interference mitigation controller 208 may perform a detection process to detect a victim device. A variety of signal processing methods may be used to detect victim wireless devices. In some cases, detecting and reporting the frequency of a victim signal is simplified if a grid of discrete points is laid out along the frequency axis. In some cases, the separation between frequency points is approximately equal to the expected bandwidth of a signal transmitted by an expected victim wireless device. Wireless protocols that use Orthogonal Frequency Division Multiplexing (OFDM), such as the WiMedia UWB specification, may include a Fast Fourier Transform (FFT). For example, PHY 204 may include an FFT in its receiver. An FFT may act as a bank of narrow bandpass filters. In the case of MB-OFDM, which is used in the WiMedia UWB specification, it may be convenient to make the points on the frequency grid match the subcarrier frequencies of the FFT. The location of a victim signal may then be specified using one or more subcarrier indices. Separating adjacent indices by the width of a subcarrier may be sufficient when using the WiMedia UWB specification since the separation is 4.125 MHz. In the example of FIG. 1, the victim wireless device (MSS 104) is a WiMAX device where the channel bandwidth may be on the order of 5 MHz and a spacing of 4.125 MHz may be sufficient.

In some embodiments, an interference mitigation controller is particularly concerned with a subset of frequencies. These frequencies may be referred to as protected bands. In some embodiments, interference mitigation controller 208 processes data associated with a frequency, even if that frequency is not a protected band. That is, even if a frequency is not a protected band, that frequency may be scanned for victim wireless devices and a notch may be created in that frequency. In some embodiments, interference mitigation controller 208 performs interference mitigation processing only on protected bands. A protected band may not necessarily be in active use by a victim wireless device. For example, a band may be a protected band, but there may be no wireless device in the vicinity using that particular band. Protected bands may be associated with wireless devices that are particularly susceptible to interference from wireless device 200 or are protected by a regulatory agency. To avoid introducing unnecessary notches, interference mitigation controller 208 can confine creation of notches to protected bands. A protected band may be associated with a licensed band. In a licensed band, a wireless protocol may be granted the right to operate in that frequency band by some national or multinational regulatory agency. The specific band(s) allocated to a certain wireless protocol may vary depending upon which region in the world the wireless protocol is being used in. Alternatively, interference mitigation controller 208 in some embodiments is concerned with the entire bandwidth over which wireless device 200 operates.

As an example of using protected bands, consider the detection of narrowband signals. If the protected bands are limited to a relatively small set of frequencies, it may be possible to lower the detection threshold, thus increasing the probability of detecting a victim wireless device. If the potential notches are limited to the protected bands, false alarms resulting in superfluous notches may be less of a concern. In some cases, if the protected bands have a relatively small total bandwidth, interference mitigation controller 208 may make an a priori decision to notch all of the protected bands without relying on signal measurements associated with a detection process. A relatively small total bandwidth may be on the order of 20 MHz.

Interference mitigation controller 208 is used to obtain information associated with an active band and database 210 may be used to store it. An active band is defined to be a band that is being used by a victim wireless device. A band can be an active band even if a wireless device using the band occasionally stops transmitting because of, for example, an empty transmit queue or some wait associated with accessing a wireless channel. Interference mitigation controller 208 may perform a detection process to determine an active band and store information associated with active bands in database 210. An active band detected by another wireless device (which interference mitigation controller 208 may not necessarily have detected) may be stored in database 210 and used in determining an appropriate action to avoid a victim wireless device. For example, only some of the bands of the frequency bands allocated to a certain wireless protocol within a regulatory region may be active bands. In a country that has allocated a 200 MHz bandwidth from 3.4 to 3.6 GHz for the WiMAX narrowband protocol, only a few bands may be active in a local neighborhood, corresponding to perhaps a total bandwidth of 10 or 20 MHz.

By exchanging interference mitigation information, some wireless devices are able to use information for which they have no capabilities to obtain. For example, one wireless device may be a dual mode device having a UWB radio and a narrowband radio operating within the UWB bandwidth. Not all wireless devices attempting to mitigate interference may be dual mode devices. By exchanging information, single mode devices are able to be aware of victim wireless devices detected by a dual mode device. An interference mitigation controller associated with the dual mode device may obtain the frequency range of an active band and communicate this information to other wireless devices. To reduce the impact on a victim wireless device, an interference mitigation controller that receives this information may promptly activate some form of avoidance to protect the active band. Information from another device may be propagated for more than one hop where a transmission from one wireless device to another is considered a hop. If multiple hops are allowed, a device that receives interference mitigation information may propagate that information. Alternatively, a one hop communication method may be used, where a receiving device is not permitted to propagate received information further.

In some embodiments, a wireless device has access to a second network. A second network may be associated with a channel other than the wireless channel used to communicate with other wireless devices in a group. For example, the second network may be a wired network, such as a wired Ethernet network. In some embodiments, access to the Internet is available through the second network. Via a second network, protected band or other information may be obtained. Interference mitigation controller 208 may be able to determine its location (for example, which country it is operating in) or if there are any protected bands. In some cases, some wireless devices may not have access to a second network, and information from a second network may be transmitted to other wireless devices. By transmitting interference mitigation information, wireless devices that do not have access to a second network may still be able to use information from the second network.

In some embodiments, interference mitigation controller 208 has a variety of levels of protection associated with protected bands. For example, some narrowband wireless protocols may require more protection than others. One wireless protocol may be designed for use in an indoor environment, bringing it in close proximity to an interfering wireless device. Another wireless protocol may be designed to operate in outdoor environments where interfering wireless devices are not expected to operate. In the first case, the level of protection may require the insertion of a spectral null. In the second case, a level of protection associated with reducing an activity factor may suffice. A level of protection may be associated with a prescribed action to avoid any detected victim wireless devices. An action associated with a level of protection may necessarily not be implemented until a victim wireless device is actually detected.

In some embodiments, interference mitigation controller 208 performs all functions associated with interference mitigation. For example, PHY 204 may pass the output from an FFT in its receiver to interference mitigation controller 208 to analyze and detect the presence of a victim wireless device. Interference mitigation controller 208 may pass control information to MAC 202 or PHY 204. For example, interference mitigation controller 208 may direct MAC 202 to refrain from transmitting at certain times or may direct PHY 204 to insert a notch at certain frequencies. In some embodiments, some interference mitigation control functions are performed by MAC 202, PHY 204, and/or radio 206. A variety of configurations may be used.

Figure 3:
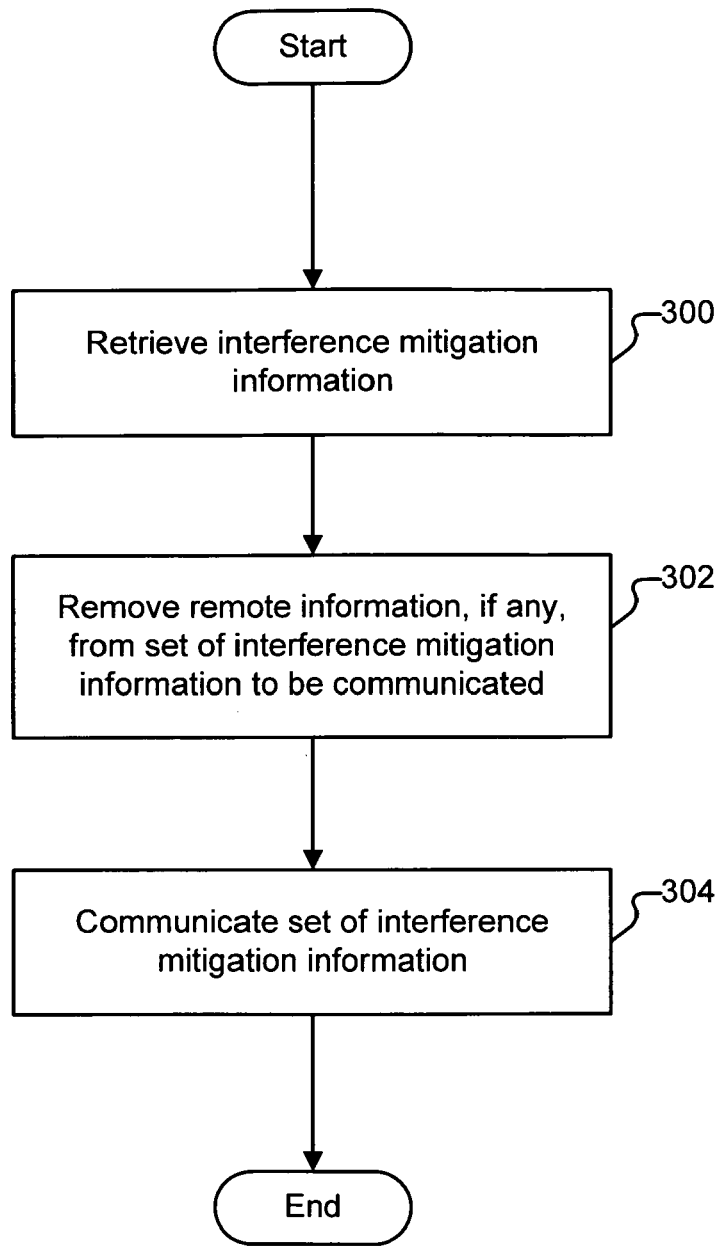
FIG. 3 is a flowchart illustrating an embodiment of transmitting interference mitigation information to other devices.

FIG. 3 is a flowchart illustrating an embodiment of transmitting interference mitigation information to other devices. In the example shown, one or more components of wireless device 200 may perform the process illustrated when communicating interference mitigation information to other wireless devices. At 300, interference mitigation information is retrieved. For example, interference mitigation controller 208 may retrieve this information from database 210. Retrieved information may originate from the wireless device performing the process or may be associated with another wireless device. The information retrieved may include a variety of information. For example, detection parameters associated with detecting a victim wireless device may be retrieved. A wireless device may retrieve information indicated when and/or at what frequency a detection process is to be performed at. Detection parameters may include protected band information, a level of protection, a prescribed action, etc. Results from a detection process may be retrieved and may include the strength of a received signal, or may simply identify an active band. Instructions may be retrieved. For example, using a centralized protocol, a controlling wireless device in a group may perform decision making for other wireless devices in the group. A controller wireless device may direct other wireless devices to perform an interference mitigation action, such as creating a notch at a certain frequency.

Remote information, if any, is removed from a set of interference mitigation information to be communicated at 302. Remote information may be defined as information that exceeds some limit. In some embodiments, the limit is a hop limit. For example, if the hop limit is 1, then a wireless device may transmit interference mitigation information that originates from itself, such as the results of its detection process, but a wireless device that receives that information does not transmit the received information further. By using a hop limit, the propagation of information may be limited to a specific number of hops. In some embodiments, a time limit is used. For example, information may be removed if it exceeds some time limit. A time limit may be with respect to a variety of starting times. For example, wireless device A may transmit interference mitigation information to wireless device B; wireless device B may determine whether the received information exceeds a time limit. A time limit may be with respect to when wireless device A obtained the information (e.g., when a process that generated the information completed) or may be with respect to when wireless device B received the information from wireless device A.

Removing information at 302 may include removing remote information from memory if appropriate. This may make memory available for other information, prevent remote information from being transmitted to another device, and/or prevent remote information from being used in decision making. In some cases, information may be kept in memory even if it is remote information. For example, if a hop limit and a time limit are both used, it may be possible for the hop limit to be exceeded but not the time limit. In such cases, it may be appropriate to keep the information in memory so it may be used by an interference mitigation controller, but the information may not necessarily be transmitted to another wireless device.

At 304, the set of interference mitigation information is communicated. A variety of frame types and portions of a frame may be used to communicate the set of interference mitigation information. In one example, the body of a beacon frame may be used. Information elements may be used in a beacon body to indicate that the information is associated with interference mitigation. In some embodiments, information communicated in a beacon body is relatively static information. A beacon may be transmitted less frequently compared to other frames, such as data frames, and it may be efficient yet still effective to transmit relatively static information less frequently. In another example, the header of a data frame may be used. In some embodiments, information that changes relatively frequently may be communicated in the header of frames. If needed, the interference mitigation information could change on a frame by frame basis. Other types of frames, such as frames associated with control or management functions, may be used. In some embodiments, a frame dedicated to communicating interference mitigation information may be used.

In some embodiments, interference mitigation information that is transmitted includes modified subcarrier information. Modified subcarriers may be described in a variety of ways, including the use of indices, pairs of indices, or triplets of indices. Modified subcarriers, including lining subcarriers, may be described in other ways beside the following examples. In some embodiments, a pair of integers (m,n) is used, where m is the index of the first notch subcarrier in the notch and n is the total number of notch subcarriers in the notch. This format may be used when band hopping is not performed and a single band is used.

In some cases, band hopping is performed where multiple hop bands are used. For example, six integers may be used to describe the notch subcarriers in each band. The first two integers may be used to specify notch subcarriers in the first band of the Time Frequency Code (TFC), the next two integers may be used to specify notch subcarriers in the second band, and the last two integers may be used to specify notch subcarriers in the third band.

In some embodiments, a triplet of integers (k,m,n) is used, where k indicates the hop band where the notch appears and m and n are as described above. Hop band indicator k specifies the position of the band within the TFC (e.g., first hop band, second hop band, third hop band), not necessarily the band number as described by a wireless specification (e.g, band 10 of 14, band 11 of 14, band 12 of 14). Multiple triplets may be used.

In some embodiments, a first set of interference mitigation information is transmitted at a first time, and a second set of interference mitigation information may be transmitted at a second time. The first set and second set of information may be grouped based on the type of information included. For example, the first set of information may include detection parameters, such as when and at what frequency a detection process will be performed at. The second set of information may include results of a detection process. In some embodiments, the first set and second set of information are grouped based on how frequently the information changes. For example, the first set of information may include relatively static information and the second set of information may include relatively dynamic information. Different communication techniques may be used to transmit the first set of information and the second set of information. For example, a frame dedicated to transmitting interference mitigation information may be used for the first set and a beacon frame may be used for the second set.

Figure 4:
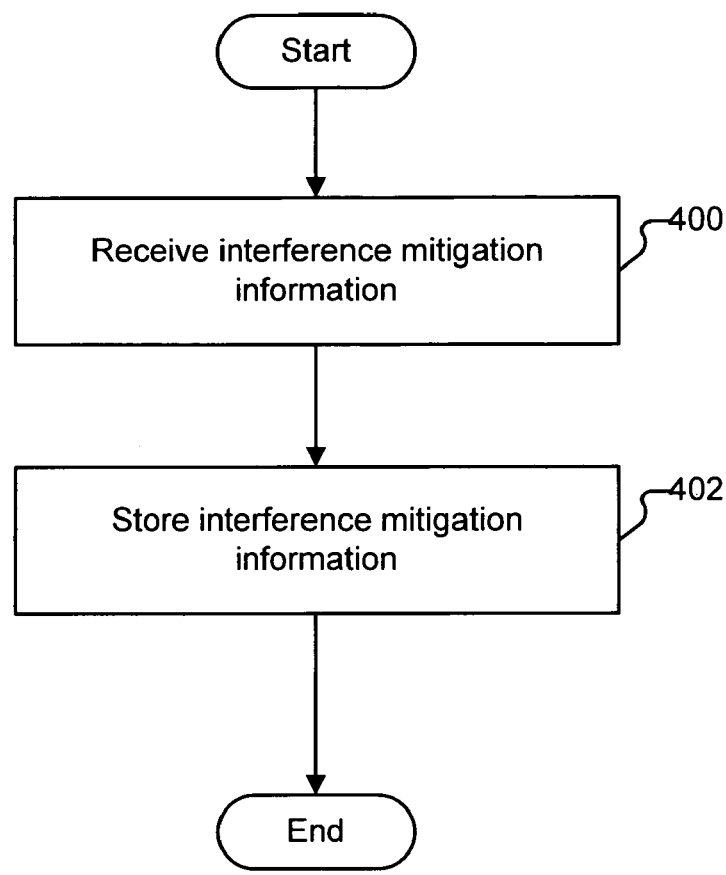
FIG. 4 is a flowchart illustrating an embodiment of receiving interference mitigation information.

FIG. 4 is a flowchart illustrating an embodiment of receiving interference mitigation information. In the example shown, interference mitigation controller 208 may perform the process illustrated when receiving information from other wireless devices. In some embodiments, an interference mitigation controller exchanges information bi-directionally. That is, information is transmitted to and received from other wireless devices. In some embodiments, information is communicated uni-directionally. A wireless device may only receive information or may only transmit information.

At 400, interference mitigation information is received. In some embodiments, interference mitigation information is received in the body or header of a received frame. For example, MAC 202 or PHY 204 may parse a received frame and pass information included in the received frame to interference mitigation controller 208.

Interference mitigation information is stored at 402. For example, interference mitigation controller 208 may store received information in database 210. A variety of information used to manage stored information may also be stored. For example, a timestamp, a hop count, the immediately prior source of the information, or the originator of the information may also be stored.

Figure 5:
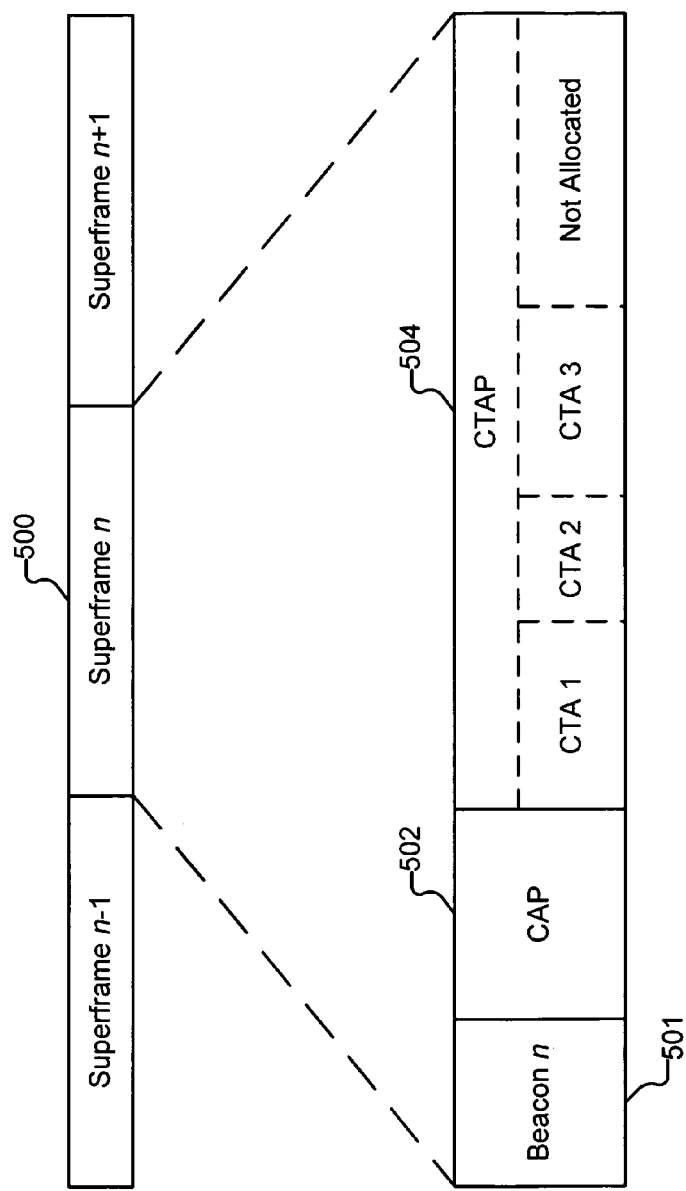
FIG. 5 is a diagram illustrating an embodiment of a superframe structure used by a group of wireless devices that use a centralized protocol.

FIG. 5 is a diagram illustrating an embodiment of a superframe structure used by a group of wireless devices that use a centralized protocol. In the example shown, the timing of transmissions in a group is based on superframe 500. Superframe 500 includes beacon period 501, Contention Access Period (CAP) 502, and Channel Time Allocation Period (CTAP) 504. During beacon period 501, a beacon frame is transmitted by a coordinating wireless device. A beacon frame may define the start of a superframe and may be used by a coordinating wireless device to broadcast commands, system parameters, or other information to other wireless devices in a group. Each command or parameter may be encoded in an Information Element (IE) with a specific format. Information elements may be included in the beacon payload.

CAP 502 may be an optional period and may be used for communicating MAC commands or asynchronous data. During CAP 502, wireless devices in the group may attempt to access the medium using Carrier Sense Multiple Access with Collision Avoidance (CSMA/CA). This is a method where wireless devices in the group compete for access to the wireless medium.

CTAP 504 includes Channel Time Allocations (CTAs). A CTA may be a time period in which one wireless device is able to transmit frames without having to contend with other wireless devices. The coordinating wireless device for the group may be responsible for granting and allocating CTAs. In some embodiments, there are different types of CTAs. For example, a management CTA may be used to exchange MAC commands between the coordinating wireless device and one or more other wireless devices.

In some embodiments, an interference mitigation process or communication may be scheduled during one of the periods in superframe 500. In some embodiments, the same process or communication is scheduled for successive superframes. In some embodiments, a period during which a process or communication occurs may change on a superframe by superframe basis.

As an example of an interference mitigation process, a wireless device may attempt to detect victim wireless devices during a CTA in CTAP 504. A group of wireless devices may refrain from transmitting in order for a signal to be received from a victim wireless device. By establishing a CTA, a group of wireless devices may be prevented from transmitting during that CTA, thus enabling an effective detection process to be performed. In some embodiments, all wireless devices in a group perform detection during the same CTA. In some embodiments, a single wireless device in a group performs detection during a given CTA. For example, a coordinating wireless device may be the only wireless device in a group to perform detection. Other interference mitigation processes may be associated with a particular period in a superframe.

A wireless device may communicate interference mitigation information during a period in superframe 500. For example, a coordinating wireless device may communicate information or instructions in a beacon frame transmitted in beacon period 501. Information communicated may include results from a detection process or an instruction to perform an action. An instruction communicated may be an instruction to notch certain subcarriers in certain bands. Alternatively, other periods in superframe 500 may be used.

In some embodiments, interference mitigation information is transmitted to neighboring devices using one or more information elements in a beacon frame. For example, the current set of modified subcarriers may be transmitted in this manner. A wireless device in a distributed group or a controlling device in a centralized group may use an IE in a beacon frame. An IE may identify the modified subcarriers, may quantitatively describe an attenuation level associated with a notch subcarrier or a lining subcarrier. In some embodiments, an IE with such information is transmitted every superframe. In other embodiments, an IE is transmitted periodically with a specified maximum period. The maximum period may be a system parameter that is fixed or configurable.

Information or an instruction associated with interference mitigation may be directed specifically to one wireless device in a group or may be broadcast to multiple members of a group. In some embodiments, a wireless device associated with one group may store information transmitted by a member of another group.

In some embodiments, a group of wireless devices communicates using a distributed protocol. There may be no coordinating wireless device in a group; wireless devices in a group may share management or synchronization responsibilities and may contend for access to the wireless medium. The following figure illustrates an embodiment of a superframe structure for such a group.

Figure 6:
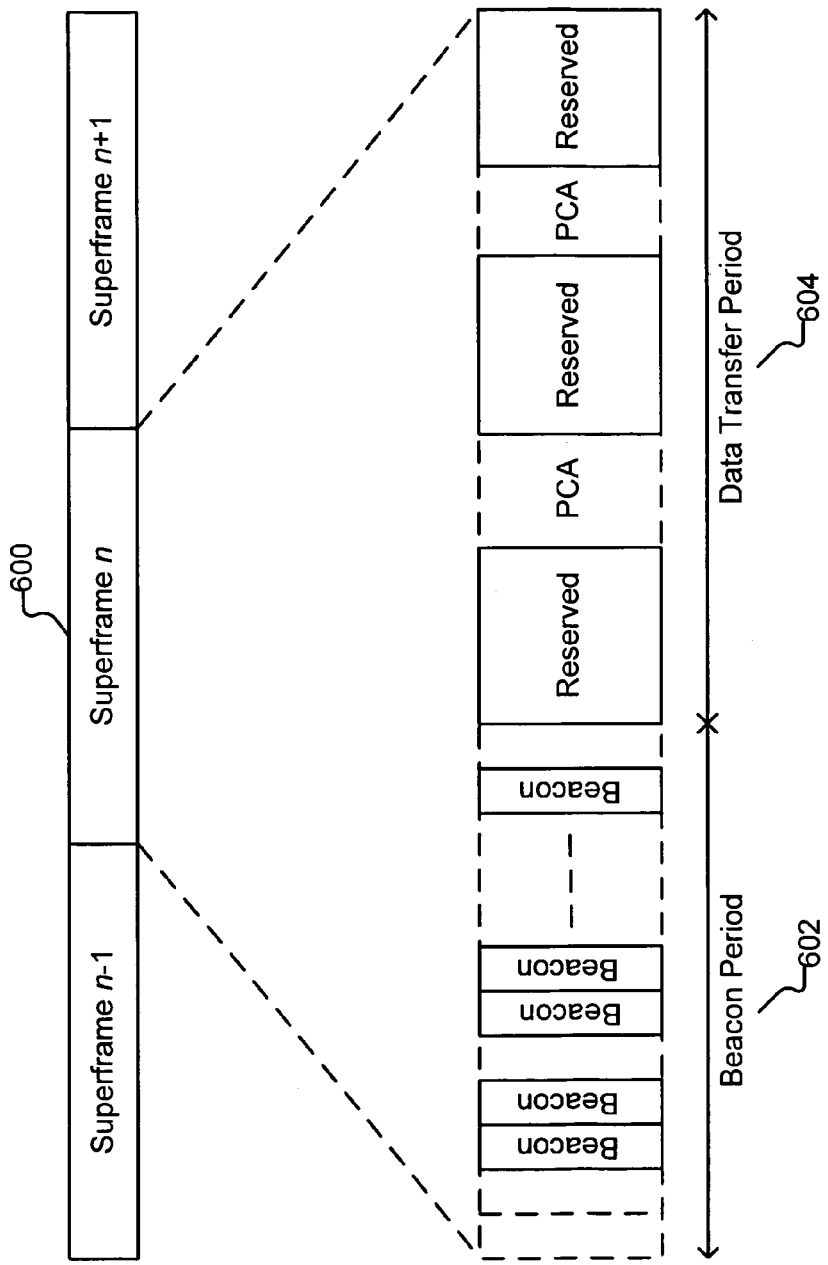
FIG. 6 is a diagram illustrating an embodiment of a superframe structure used by a group of wireless devices that use a distributed protocol.

FIG. 6 is a diagram illustrating an embodiment of a superframe structure used by a group of wireless devices that use a distributed protocol. In the example shown, superframe 600 includes beacon period 602 and data transfer period 604. Beacon period 602 is divided into beacon slots. Each wireless device in a group transmits a beacon frame during beacon period 602. A given wireless device may consistently transmit its beacon frame in a particular beacon slot and may listen for beacon frames from other devices during the other slots. When a wireless device using a distributed protocol first begins operation, the wireless device may scan for beacon frames. If no beacon frames are received, a wireless device may start a new beacon period. If a beacon frame is received, the wireless device uses an existing beacon period by choosing an available beacon slot for its beacon transmissions. In some cases, multiple superframe structures may be detected and a wireless device may decide which superframe structure to use (i.e., decide which group to join). A wireless device in some cases may not be within range of all wireless devices in a group and may miss some beacon frames. A set of wireless devices whose beacon frames can be received by a given wireless device may be referred to as the beacon group for the given wireless device. Each wireless device may have a different beacon group associated with it.

A wireless device may send interference mitigation information to another device in an Information Element (IE). An IE may be included and transmitted in a wireless device's beacon frame. In some embodiments, a wireless device may repeat transmission of interference mitigation information, even if it has not changed, for multiple superframes. This may be useful if some wireless devices in group are in a power save mode. Even if they do not receive beacon frames during one beacon period, they may receive it during another beacon period of another superframe. In some cases, an IE may specify the address of an intended recipient to which an IE is directed toward. However, even if an IE is addressed to a specific wireless device, any device capable of received that beacon frame may obtain, store, or use information contained in an IE. In some embodiments, each specific type of control information, such as a certain command, has a predefined IE format. An IE may be optional; each wireless device may determine whether to include an IE in a given beacon.

Data transfer period 604 may be associated with transmitting and receiving data frames. A variety of access techniques may be used, including Prioritized Contention Access (PCA) or Distributed Reservation Protocol (DRP). PCA permits multiple devices to contend for access to a wireless channel and may be based on traffic priority. A reserved time slot may be established using DRP. A DRP grants a wireless device exclusive access to the channel within a negotiated time slot. In some embodiments, each wireless device may make a reservation by declaring a reservation which may be subject to some limits on duration. In some embodiments, there may be different types or priorities of reservations. For example, a wireless device may indicate that a reservation is associated with detecting a victim wireless device, or may indicate that a reservation is associated with transmitting data frames.

During a period in superframe 600, a wireless device using a distributed protocol may perform a process or may communicate interference mitigation information. In a group that uses a distributed protocol, each wireless device may decide for itself what process to perform and when to perform a particular process. Each wireless device may determine on its own what information to communicate to other wireless devices and when to communicate this information.

As an example of a process performed during superframe 600, a wireless device may attempt to detect victim wireless devices during a period in superframe 600. In some embodiments, a reservation in data transfer period 604 is used. A wireless device with a reservation may perform narrowband signal measurements within the reservation. In some embodiments, every few superframes the entire reservation is employed for detection instead of transmitting data frames. In some embodiments, detection is performed every reservation after the last frame has been transmitted. If an acknowledgement is requested, a detection process may be performed after the last acknowledgement frame. When calculating the number of frames to fit within a reservation, a transmitting wireless device may take into account time used for narrowband signal measurement. In some embodiments, multiple wireless devices use the same reservation to detect victim devices. This may be more efficient than if every wireless device had its own reservation to detect wireless devices. In some embodiments, a special type of reservation associated with detection is used.

Other periods beside a reservation may be used by a wireless device to detect a victim wireless device. For example, a wireless device may have two radios, one of which is configured to receive signals transmitted by a victim wireless device. A wireless device attempting to detect victim wireless devices may listen during a PCA in data transfer period 604. Occasionally, a wireless device may be able to detect a victim wireless device when it receives a signal transmitted by the victim wireless device.

Interference mitigation information may be transmitted by a wireless device during a period of superframe 600. A variety of frames and periods in superframe 600 may be used. For example, beacon period 602 may be used. A wireless device may use an IE in its transmitted beacon to communicate interference mitigation information including, but not limited to, detection parameters, results from a detection process, or modified subcarrier information0. Or, some or all interference mitigation information may be communicated during data transfer period 604. For example, a header of a frame transmitted during data transfer period 604 may include interference mitigation information. In some embodiments, a first set of information is transmitted during beacon period 602 and a second set of information is transmitted during data transfer period 604.

In one example of communicating interference mitigation information, a device includes an IE in its beacon when a change occurs, such as when a new narrowband signal has been detected. Information included in an IE may be incremental, meaning that it only contains active bands not previously reported. Further, when a device determines that a signal has not been detected for the last $T_a$ seconds, it declares that the signal has vanished and reports this in an IE. If the signal strength of a previously reported narrowband signal changes drastically, this is may also reported in an IE. By transmitting incremental information, the amount of overhead in a beacon frame may be kept to a relatively small amount.

In another example, a wireless device may periodically include interference mitigation information in its beacon. The period may be a parameter determined by each wireless device or may be the same value for the entire group. A beacon frame may include all narrowband signals detected within the last $T_a$ seconds. This may be attractive in some applications since an indication that a signal has vanished is not used. It may also be an advantage if up to date signal strength information for all detected narrowband signals is included. In some embodiments, the parameter $T_a$ and the reporting period are the same value.

Figure 7:
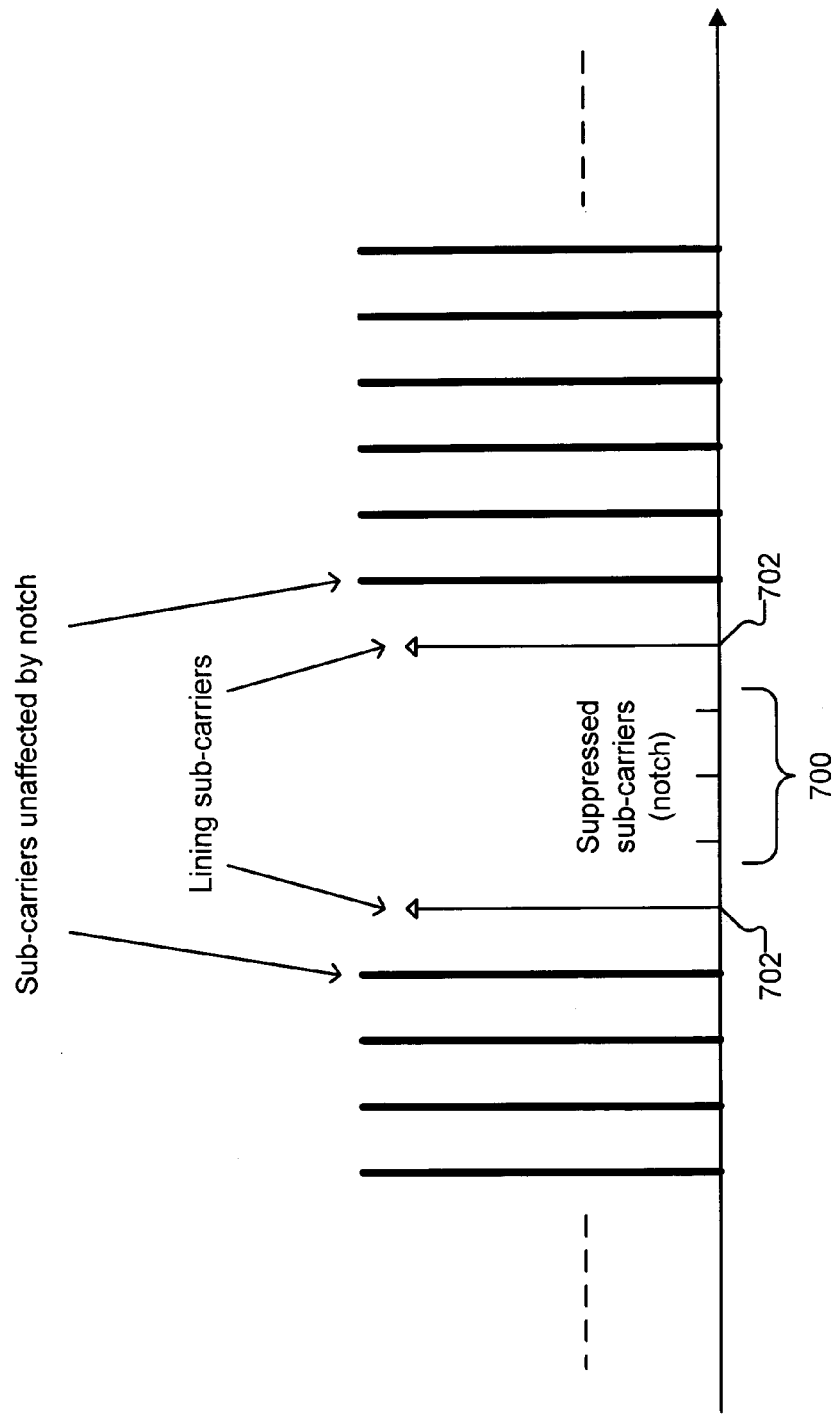
FIG. 7 illustrates an embodiment of a spectrum that includes modified subcarriers.

FIG. 7 illustrates an embodiment of a spectrum that includes modified subcarriers. In the example shown, a victim wireless device may be transmitting in an active band and some subcarriers may be modified to mitigate interference with the victim wireless device around the active band. A variety of techniques may be used to mitigate interference.

For example, notches or nulls may be introduced in the UWB signal spectrum in an active band occupied by a victim wireless device. A victim wireless device may be a transmitting wireless device or a receiving wireless device. In some embodiments, a wireless device with an interference mitigation controller is a UWB device configured to support Multi-Band Orthogonal Frequency Division Multiplexing (MB-OFDM). MB-OFDM may be convenient for notching, since the OFDM waveform may be generated using an inverse Fourier transform. A notch in a spectrum can be created by nulling or zeroing out data for a group of contiguous subcarriers. For example, subcarriers 700 are notch subcarriers. This may be sufficient to generate moderately deep notches, for example with attenuation on the order of 10 to 20 dB. In some embodiments, deeper notches are desired and the amplitude and/or phase of neighboring subcarriers may be manipulated to achieve even more attenuation. Neighboring subcarriers that are modified but not zeroed out are referred to as lining subcarriers. For example, subcarriers 702 are lining subcarriers.

Using the results of a detection process, a wireless device may determine which subcarriers to modify, either as notch subcarriers or lining subcarriers. In some embodiments, the results of a detection process performed by another wireless device are used. This may be useful if a victim wireless device is out of range of an interfering wireless device but the victim wireless device would be affected by a transmission from the interfering wireless device.

In the example shown, there is one lining subcarrier on each side of notch subcarriers 700. In some embodiments, there may be more than one subcarrier on each side. The number of lining subcarriers on each side may not necessarily be the same number. Data in a lining subcarrier may be amplitude or phase modulated to deepen a notch further. For example, because of imperfect components, contributions from one frequency may affect the signal level in another frequency. The amplitude and phase of a lining subcarrier may be set so as to cancel leakage from other subcarriers into the notch. In some embodiments, a lining subcarrier is not used to carry payload data. In some embodiments, payload data can be carried in a lining subcarrier, but the amplitude or phase of the data may be modified. The number of lining subcarriers may tend to grow with the width of a notch. In other words, as the number of notch subcarriers 700 increases, the number of lining subcarriers 702 may also increase.

A wireless device may employ a variety of techniques to avoid interfering with a victim wireless device besides creating notch subcarriers in a band. In some embodiments, an entire band may be dropped. This may be useful if a relatively high degree of attenuation is required or if there are a relatively large number of notch subcarriers. Other techniques that may be used include reduction of an activity factor (thus providing more quiet time) and reduction of transmit power (thus reducing interference uniformly across frequencies, even for frequencies where a victim wireless device is not operating). In some embodiments, rather than notching subcarriers, a wireless device refrains from transmitting during a time that would interference with a victim wireless device. Some victim wireless devices may have regularly scheduled transmissions. When it is not a regularly scheduled transmission time, a wireless device may be able to transmit without interfering with a victim wireless device. Some combination of the above techniques may be used. For example, at certain times, some subcarriers may be notched. The rest of the time, those subcarriers may be used to carry payload data.

In some embodiments, multiple notches may be combined into a single notch. For example, a wireless device may determine or be instructed to create two notches. Each notch in this example contains three notch subcarriers. To achieve a required degree of attenuation, data in notch subcarriers are set to zero and a lining subcarrier may be added to each side of the notch subcarriers. Some computational dependencies may result. When computing a lining subcarrier, the values of surrounding subcarriers may be needed. If two notches are located too close to each other, a lining subcarrier for one notch may depend upon the lining subcarrier of the other notch. To avoid this dependency, the two notches may be merged into a single notch. This may further degrade the performance of a link, and any anticipated performance degradation may be taken into considering when deciding whether to merge notches. In some cases, a minimum separation distance is used to simplify this decision process. Two notches may be merged when the distance between two notches is less than the minimum separation. If the minimum separation distance is exceeded, the notches are not merged.

An interference mitigation controller may store a variety of interference mitigation information. In some embodiments, some information may be received from another wireless device, and a transmitting wireless device may not necessarily be the originator of the information. The following tables illustrate some examples of information that may be stored by an interference mitigation controller. Although multiple tables are shown in these examples, in some embodiments all interference mitigation information may be stored together.

FIG. 8A is a table illustrating an embodiment of stored information associated with detection parameters. In the example shown, table 800 may be stored in database 210 and may be maintained and managed by interference mitigation controller 208. An interference mitigation controller may perform a detection process using detection parameters stored in table 800. Detection parameters may include protected band information or a level of protection.

Row 802 illustrates detection parameters associated with the interference mitigation controller that stores table 800. The number of hops, 0 in this case, indicates that the information is associated with this interference mitigation controller. The detection process is performed during data reservation 10 every superframe. During data reservation 10, this interference mitigation controller may examine received data from an FFT or data from a receiver configured to receive signals from possible victim wireless device(s). The last entry in row 802 indicates the signal strength, number of times and period of occurrence threshold parameters in order for a victim wireless device to be detected. If a signal is received that exceeds the signal strength threshold more than the threshold number of times over the period of occurrence, a victim wireless device is determined to be detected.

Row 804 illustrates stored detection parameters associated with another device. Device A is 1 hop away from the interference mitigation controller storing table 800 (i.e., there is no intervening wireless device between device A and this wireless device). Its detection period is 100 mS long beginning at time to and the detection period repeats every 5 seconds. Device A and the wireless device associated with table 800 may both maintain free running clocks that are synchronized with each other, and $t_0$ (and other time references) may occur at substantially the same time for both devices. If device A receives a signal with a signal to noise ratio greater than the stored value, device A determines that a victim wireless device is detected.

It may be useful to obtain and store detection parameters for another wireless device. For example, a group of wireless devices may want to coordinate their detection processes. This may allow detection responsibilities to be shared, enabling some wireless devices to go into a power save state and conserve power. Storing detection parameters associated with another wireless device may also be useful when that wireless device reports its detection results. An interference mitigation controller storing table 800 would be able to determine when the signal was detected, the signal strength threshold, etc.

In some embodiments, other parameters or values may be stored in table 800. For example, table 800 may include a protection level associated with each protected band. A protection level may have a prescribed action associated with it that is performed when a victim wireless device is detected. Examples of such actions include: creating a spectral null in a transmitted signal, reducing an activity level, or adjusting a transmit power level. A protection level may include the degree to which a certain action is taken. For example, in the case of a spectral notch, the amount of signal attenuation inside the notch may be indicated. For activity level reduction, a maximum activity factor may be indicated. In some embodiments, a protection level may be mandatory. For example, a band with a mandatory level of protection may be required to have a spectral null, even if that band is not an active band used by a victim wireless device. Protected bands with protection levels that are not mandatory may be monitored for activity by a victim wireless device.

In some embodiments, table 800 includes a wireless service identifier. This identifier may enable an interference mitigation controller to replace general information about an active band with local and more specific information. For example, information about the characteristics of transmissions by an expected victim wireless device, such as the expected activity factor and the duplexing method, may be stored in table 800. Duplexing refers to the method by which a wireless system separates an uplink signal and a downlink signal, such as uplink signal 108 and downlink signal 102. In Frequency Division Duplexing (FDD), the uplink signal and downlink signal occupy different bands, whereas in Time Division Duplexing (TDD) they occupy different time slots. A victim wireless device may employ a Hybrid FDD/TDD technique. Information about the characteristics may be utilized by an interference mitigation controller in devising an appropriate scheme for monitoring protected bands. For example, if FDD is used, an interference mitigation controller may choose to monitor the uplink signal rather than the downlink signal, since the signal strength may be higher in the uplink. The frequency separation between channels in the uplink and downlink direction may be defined by a regulatory agency and may be known. This may enable an interference mitigation controller to identify and protect a downlink signal based on detection of the associated uplink signal.

In some embodiments, some or all of the information in table 800 is obtained from a host system. For example, when a wireless device is powered up or activated, some information may be downloaded from the host system. An initial version of table 800 may be part of driver software in a host and may be downloaded during configuration of the wireless device following a system reset, for example after power up. Different regulatory regions in the world may have different protected band information. In some embodiments, driver software is configured to download protected band information for multiple regions of the world. In other embodiments, driver software is configured to download protected band information for a specific region. Information downloaded from a host system may be updated as appropriate over time by an interference mitigation controller.

In some embodiments, a host system with an internet connection uses an appropriate internet based method to determine the country it is in. The host may then configure the driver software to download protected band information for that particular country or region.

In some cases, an interference mitigation controller may not have access to a host system or an internet connection. A wireless device with access may communicate information obtained from a host system or an internet connection so that wireless devices without access may also be able to use downloaded information.

Information downloaded from a host system may be updated over time as changes in the allocation of frequency bands or commercial deployment of wireless devices occurs. Such updates may come as a part of host driver software updates. Alternatively, a host system with internet connectivity may periodically download the most recent version of protected band information from a defined internet location, perhaps located by a Uniform Resource Locator (URL) or an Internet Protocol (IP) address.

FIG. 8B is a table illustrating an embodiment of information associated with detection results. In the example shown, table 830 may be stored in database 210 and may be maintained and managed by interference mitigation controller 208.

Row 832 is used to store the results of a detection process performed by the interference mitigation controller that manages table 830. Included in the stored information is the time of detection, the number of hops (0 in this case, since the results are its own results), signal strength, and the spectrum of the detected signal, identified by and subcarrier. Row 834 is associated with device A. Device A may have transmitted information in row 834, and the interference mitigation controller that manages table 830 may have stored this information as row 834. Time of detection may refer to the time that an originating device detects a signal.

Signal strength information may be represented in variety of forms, including (but not limited to) narrowband signal power and ratio of narrowband signal power to noise floor level. Units may be in decibels and/or quantized using some predefined step size. In some embodiments, signal strength information is not stored. After detecting a victim wireless device, an interference mitigation controller may store the band and subcarrier(s) used by the victim wireless device and may not necessarily store the signal strength of the received signal used to detect the victim wireless device.

In some embodiments, the number of victim signals recorded in table 830 is limited. If the number of detected signals exceeds a limit, an interference mitigation controller may store information associated with signals that have the highest signal strength.

FIG. 8C is a table illustrating an embodiment of information associated with modified subcarriers. In the example shown, table 860 may be stored in database 210 and may be maintained and managed by interference mitigation controller 208.

An interference mitigation controller may use the results from a detection process (which may be performed by itself or by another wireless device) to determine which subcarriers in which bands to modify. Row 862 includes modified subcarrier information associated with the wireless device that table 860 is stored on. In some embodiments, a wireless device receives an instruction with specified subcarriers in specified bands to modify as lining or notch subcarriers. In some embodiments, a wireless device determines for itself which subcarriers in which bands to modify. In this example, the wireless device determines modified subcarriers for itself and the hop count is 0. Two notches are created: one in band 2 and one in band 11. In band 2, subcarriers 0 and 5 are lining subcarriers and subcarriers 1 thru 4 are notched. In band 11, there are no lining subcarriers and subcarriers −34 thru −32 are notched.

Row 864 includes modified subcarrier information about another wireless device, in this case device A. If a frame is received from device A, an interference mitigation controller may pass some or all of the information in row 864 to an appropriate component in the receiver so that the received frame may be properly processed. For example, some data may be replaced with erasure values and/or some data may be removed. Device A is one hop away from this wireless device and creates two notches in its transmitted signals. Band 11 has lining subcarriers −35 and −31 and notch subcarriers −34 thru −32. Band 2 has lining subcarriers 0 and 6 and notch subcarriers 1 thru 5.

Figure 9:
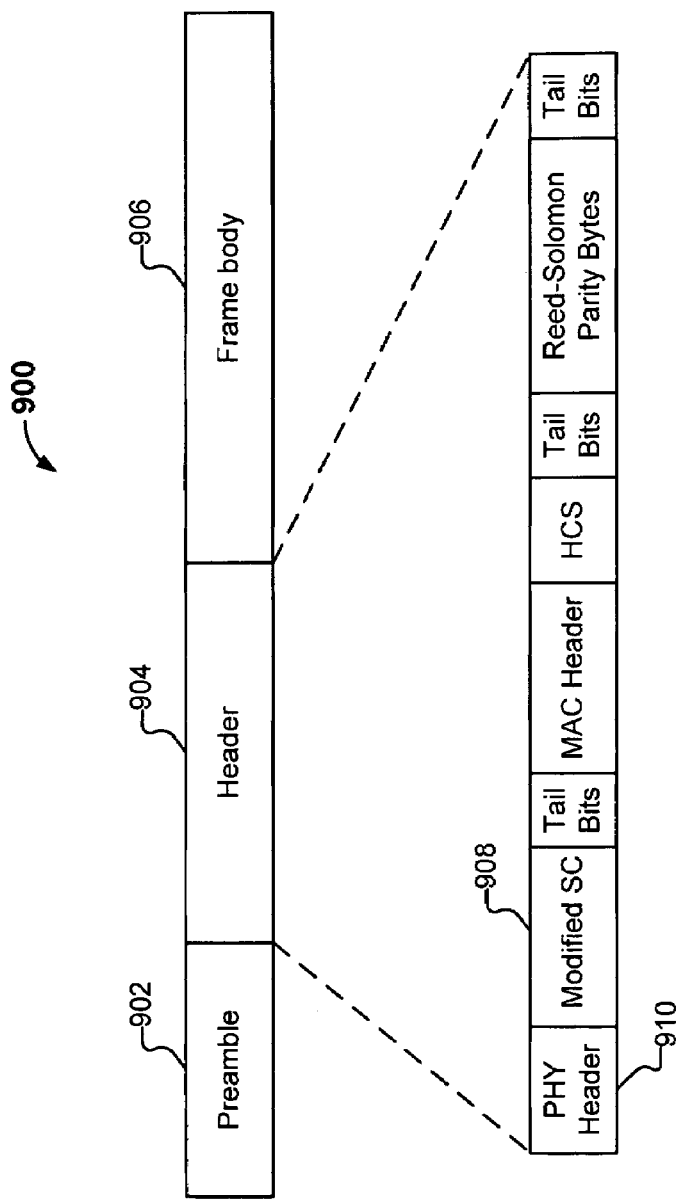
FIG. 9 is a diagram illustrating an embodiment of a frame header used to communicate information about modified subcarriers.

FIG. 9 is a diagram illustrating an embodiment of a frame header used to communicate information about modified subcarriers. In the example shown, frame 900 includes preamble 902, header 904, and frame body 906. Preamble 902 may be used by a receiving wireless device to detect frame 900 and synchronize receiver timing to frame 900. For example, preamble 902, header 904 and/or frame body 906 may include OFDM symbols and a receiving wireless device may synchronize its timing to OFDM symbol boundaries. Header 904 may include information used by a receiving wireless device to process frame 900. For example, header 904 may include a length, data rate, or error correction information.

Header 904 includes modified subcarrier field 908. In this field, modified subcarriers (and an associated band, if needed) are identified. Modified subcarriers may include lining subcarriers and notch subcarriers. To avoid interfering with one or more other devices, a transmitting wireless device may modify subcarriers. A wireless device that receives frame 900 may use modified subcarrier information 908 to properly process the received frame. Identification of a modified band or subcarrier may be explicit or implicit. For example, WiMedia UWB devices may band hop and use more than one band to transmit frame 900. A band may be identified explicitly (e.g., band 6) or implicitly (e.g., the first hop band in a Time Frequency Code used in band hopping). Modified subcarrier field 908 may identify one or more bands that are modified, and which subcarriers in particular are modified for each band. By using modified subcarrier information, an error rate at a receiving wireless device may be improved.

Communicating modified subcarrier information in a header may be convenient for a variety of reasons. For example, an interference mitigation controller may be able to change modified subcarriers relatively quickly and be able to communicate this information to other wireless devices. If a victim wireless device changes frequencies relatively quickly, this may be useful. A transmitting wireless device may be able to avoid a victim wireless device while a receiving wireless device may be able to maintain an acceptable error rate. Communicating modified subcarrier information in a header may be convenient if devices are going in and out of power save mode. A device in power save mode may miss a beacon with modified subcarrier information or be forced to power up to receive a beacon and, as a result, consume more power.

In some embodiments, a wireless device that frame 900 is not addressed to processes header 904 to obtain modified subcarrier information. For example, although a receiving address or a destination address may not necessarily be associated with a wireless device, that wireless device may process header 904 and update information it stores using header 904.

In some embodiments, a wireless protocol or specification uses only one type of header. Header 904 may be a fixed header, and modified subcarrier 908 may be transmitted in every header. In some applications it may be desirable to reduce overhead associated with header 904. Modified subcarrier field 908 may not necessarily be used in every frame, and headers that include modified subcarrier field 908 may be an optional header or an extended header. That is, in some embodiments two or more types of header can be used; some headers may contain different information or may be a different length compared to other headers. A field in a header (e.g., PHY header 910) may identify the type of header used for a given frame. Some examples of using optional and extended headers are provided below.

In some embodiments, modified subcarrier information, if transmitted, is included using an optional header format. Inclusion of modified subcarrier information is optional and frames may or may not include this information. If modified subcarrier information is not included in a given frame, a normal or default header format may be used. For example, a normal header may include a PHY header, a first tail bit sequence, a MAC header, an HCS (Header Check Sequence), a second tail bit sequence, Reed-Solomon parity bytes, and a third tail bit sequence. Tail bits may be set to zero and may be used to force a convolutional encoder in a transmitter into an all-zero state. A HCS may be a checksum used by a receiver to verify the integrity of a PHY header and/or a MAC header. Reed-Solomon parity bytes can be used by a receiver to correct bit errors in the PHY header, MAC header, and/or HCS. If modified subcarrier information is included in a frame, an optional header format may be used. In an optional header, Reed-Solomon parity bytes may be replaced with modified subcarrier information. Alternatively, another field in header 904 may be replaced with modified subcarrier information.

In some embodiments, modified subcarrier information, if transmitted, is included in an extended header format. The inclusion of modified subcarrier information is optional and frames may or may not include modified subcarrier information. If modified subcarrier information is not included in a given frame, a normal or a default header format may be used. If modified subcarrier information is included in a frame, an extended header format is used. An extended header may have an additional field containing modified subcarrier information. The location of modified subcarrier information within a header of a frame may be in any appropriate location. In some embodiments, a modified subcarrier field may be the last field in the header of a frame. This may simplify the design of a receiver since the same sequences of fields are processed for a normal header and an extended header except for the additional field at the end of the extended header.

In some embodiments, modified subcarrier information is transmitted during a certain period within a superframe structure or with certain types of frames. In some embodiments, modified subcarrier information is transmitted with a certain type of frame. For example, frame 900 may be a beacon frame or a data frame. In some embodiments, all frames transmitted in a certain period or that are a certain type of frame include modified subcarrier information. If no subcarriers are modified this may be communicated. In some embodiments, only some frames transmitted during a period or only some frames of a certain type include modified subcarrier information.

The above figures illustrate some embodiments for communicating detection or avoidance related information. In some embodiments, some combination of or modification to the techniques described above may be used. The particular technique used may depend upon the design goals, superframe structure, wireless environment, wireless protocol, and/or regulatory restrictions of a particular application. For example, other information (such as results from a detection process) may be transmitted in addition to or instead of modified subcarrier information in the header of a frame.

A variety of techniques may be used to notch subcarriers in a band. Two example techniques are bit puncturing and bit loading. In some embodiments, a wireless device is capable of performing bit puncturing and bit loading. Such a wireless device may determine which technique to use to notch subcarriers. A wireless device capable of performing both techniques may be useful since it may be capable of communicating with bit puncturing only wireless devices and bit loading only wireless devices. Other techniques besides bit loading or bit puncturing may be used to notch subcarriers. The following figures describe some embodiments of transmitters and receivers that perform bit puncturing and bit loading.

Figure 10:
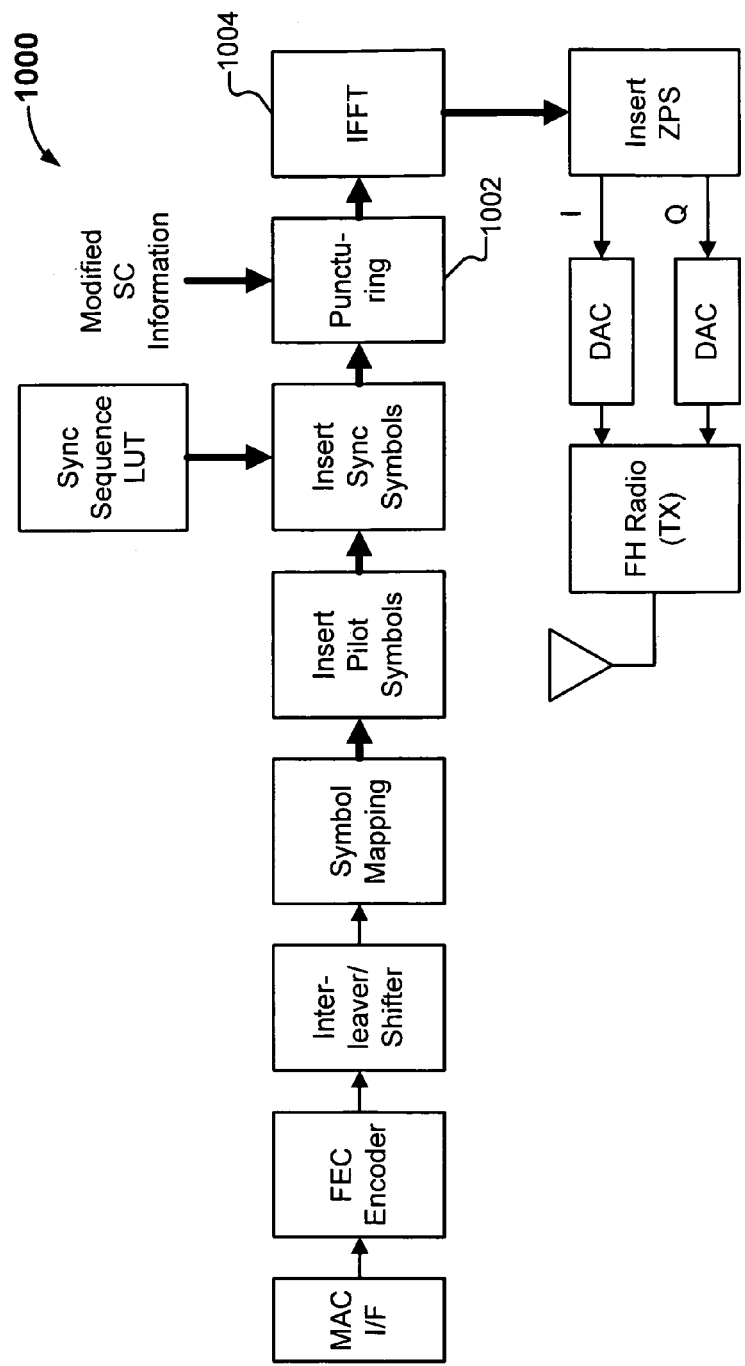
FIG. 10 is a block diagram illustrating an embodiment of a transmitter of a wireless device configured to perform bit puncturing.

FIG. 10 is a block diagram illustrating an embodiment of a transmitter of a wireless device configured to perform bit puncturing. In the example shown, transmitter 1000 may be included in a PHY module and a radio module, such as PHY 204 and radio 206 in FIG. 2. A wireless device with such a transmitter may be able to avoid a frequency spectrum used by a victim wireless device.

Using bit puncturing, the mapping of code bits onto subcarriers is unaffected by the presence of notch subcarriers. The amplitude and phase of blank subcarriers may be replaced with new amplitude and phase values. New amplitude and phase values may be selected so that spectral notches are created. As a result, code bits mapped onto blank subcarriers are punctured and are not transmitted. Redundancy provided by an error correcting code and/or symbol repetition may be sufficient for the receiver to reconstruct data missing as a result of bit puncturing. To limit performance degradation that results from bit puncturing, a receiver may replace demodulated code bits in blank subcarriers with erasures. An erasure is a special bit value indicating that no information is available on the receiving side regarding the true value of the bit. An erasure may be considered to be a neutral or non-indicative value. By using an erasure for blank subcarriers, an error correcting decoder may disregard these code bits when reconstructing the transmitted data during error correction processing.

Transmitter 1000 performs bit puncturing to notch subcarriers in a band. Puncturing block 1002 replaces the amplitude and phase of data mapped to notch subcarriers with new values. Data that is replaced may be discarded. Puncturing block 1002 performs this operation and passes its output to Inverse Fast Fourier Transform (IFFT) 1004. It may be possible to use a single puncturing block to notch OFDM symbols in the body of a frame as well as synchronization (preamble) symbols in the preamble of a frame.

In some embodiments, puncturing block 1002 or another block modifies data associated with lining subcarriers. The amplitude or phase of data mapped to a lining subcarrier may be modified to achieve a desired level of suppression for the lining subcarriers.

Control settings or values used in bit puncturing may be provided by an interference mitigation controller (not shown). For example, an interference mitigation controller may pass modified subcarrier information to puncturing block 1002. In some cases, modified subcarriers vary depending on which band a wireless device is using. Band information may also be provided by an interference mitigation controller.

Figure 11:
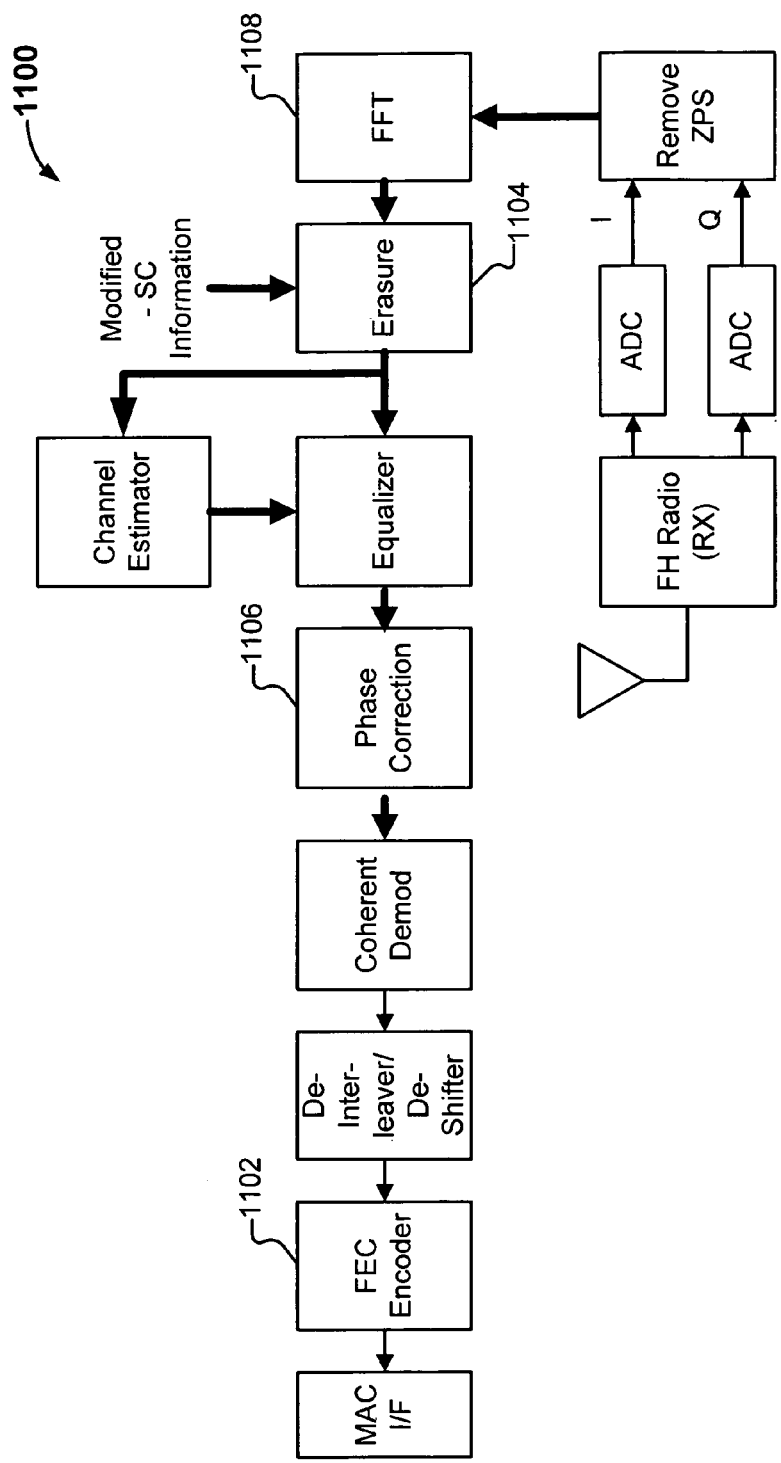
FIG. 11 is a block diagram illustrating an embodiment of a receiver of a wireless device configured to perform bit puncturing.

FIG. 11 is a block diagram illustrating an embodiment of a receiver of a wireless device configured to perform bit puncturing. In the example shown, receiver 1100 may be included in a PHY module and a radio module, such as PHY module 204 and radio 206 in FIG. 2.

In some embodiments, Forward Error Correction (FEC) decoder 1102 is a soft input FEC decoder. Demodulated code bits entering FEC decoder 1102 are not hard decisions (i.e., limited to values or −1 or +1), but rather a soft decision over a range of values with R as a measure of reliability. Letting R=0 for a soft bit may be equivalent to replacing a soft bit with an erasure.

Erasure block 1104 sets data associated with notch subcarriers to zero. In some receiver embodiments, data associated with a pilot subcarrier that is blank is set to zero to avoid affecting phase correction processing performed by phase correction block 1106. Pilot subcarriers may be used for phase correction and may contain no payload data. Notch subcarriers may be identified using modified subcarrier information passed to erasure block 1104. In some embodiments, modified subcarrier information is included in the header of a frame. In such cases, it may be inefficient or take too much time for the modified subcarrier information to be passed from receiver 1100 to an interference mitigation controller (not shown) and back to erasure block 1104. It may be more convenient if modified subcarrier information obtained from a header of a frame is passed directly to erasure block 1104. In parallel, this information may be passed to an interference mitigation controller. Any appropriate block, including erasure block 1104, may be used to extract this information from the header of a frame. Alternatively, modified subcarrier information may be communicated infrequently. In such cases, an interference mitigation controller may store this information and pass it to erasure block 1104 since the information changes relatively infrequently.

In some receiver embodiments, the reliability R of each soft bit is set to a value that is proportional to the estimated amplitude of the subcarrier from which the soft bit was obtained, i.e. the amplitude is applied as a weight factor. In some embodiments, R is set to a value that is proportional to the amplitude of that subcarrier for lining subcarriers.

Although this example illustrates setting data to zero immediately after Fast Fourier Transform (FFT) 1108, in some embodiments equivalent processing may be performed at different points in the path of transmitter 1100. For example, the estimated amplitudes for blank subcarriers may be set to zero before those amplitudes are applied as weight factors. This may be equivalent to setting the corresponding soft bits to zero.

In some embodiments, a receiver that processes a bit punctured signal does not include erasure block 1104. A receiver may use data received in notch subcarriers or lining subcarriers without replacing the data with an erasure value. The performance with such a receiver may still be satisfactory, particularly if a lower data rate is used. Lower data rates may tend to have stronger error correction capabilities or may have symbol repetition compared to higher data rates.

Figure 12:
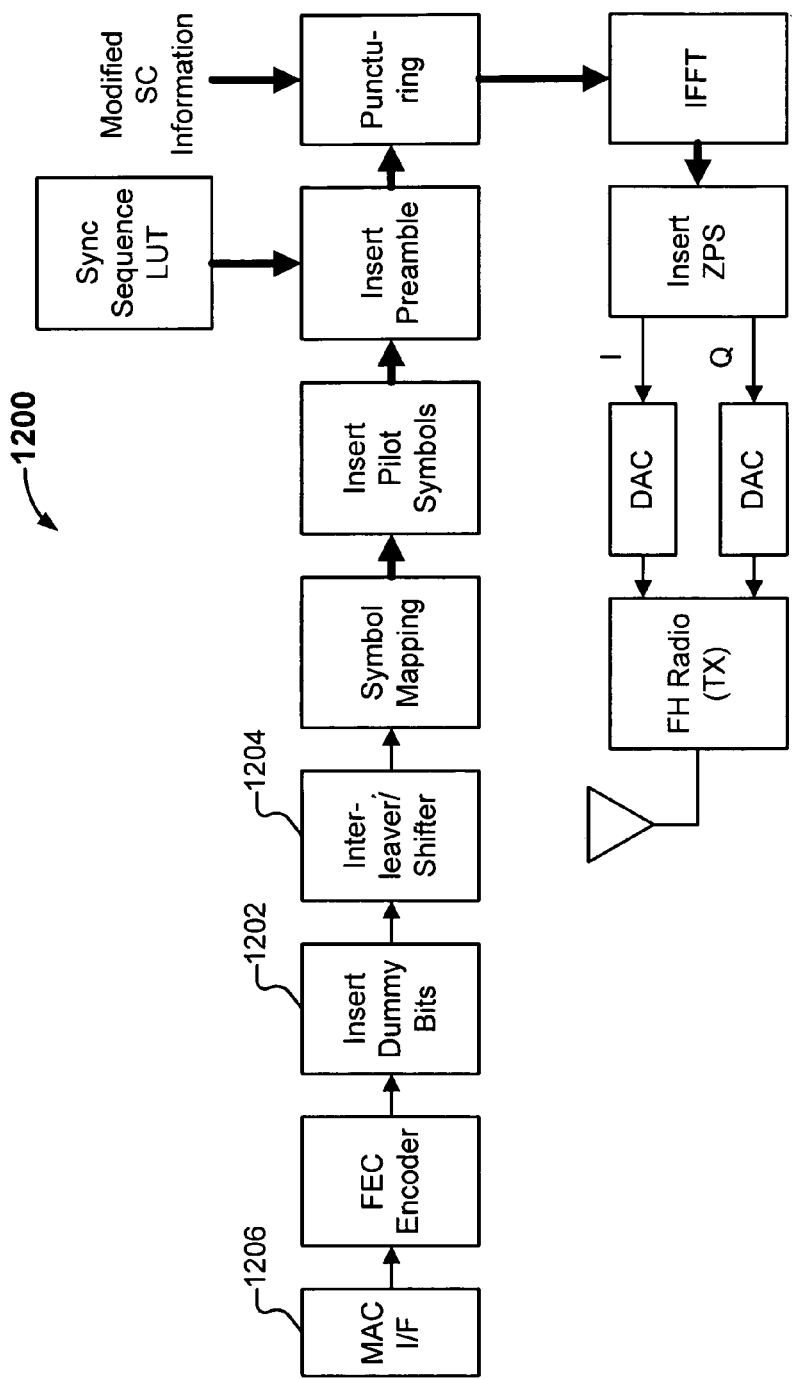
FIG. 12 is a block diagram illustrating an embodiment of a transmitter of a wireless device configured to perform bit loading.

FIG. 12 is a block diagram illustrating an embodiment of a transmitter of a wireless device configured to perform bit loading. In the example shown, transmitter 1200 may be included in a PHY module and a radio module, such as PHY module 204 and radio 206 in FIG. 2. A wireless device that includes transmitter 1200 may be able to avoid a victim wireless device by performing bit loading.

Using bit loading, code bits are mapped onto subcarriers that are not notched. As the number of notch subcarriers increases, the data rate may decrease. This may be acceptable in some applications, particularly if there are relatively few notch subcarriers and any data rate reduction is correspondingly small. In some cases, band hopping is performed and two hop bands do not necessarily have the same number of blank subcarriers. If so, the number of bits carried by symbols in the two bands may be different. Insert dummy bits block 1202 inserts dummy bits and passes its output to interleaver shifter 1204. Dummy bits inserted by insert dummy bits block 1202 may be arbitrary values. In some cases, neutral or zero values are used. The number of dummy bits inserted by block 1202 corresponds to the number of notch frequencies for a particular band. This allows interleaver shifter 1204 to process a fixed number of bits, some of which may be dummy bits. Dummy bits are inserted in a certain locations so that after processing by interleaver shifter 1204, dummy bits are mapped onto notch subcarriers and no payload data is mapped to a notch subcarrier. Although this may reduce the data rate, a wireless device may be able to transmit all of its payload data while avoiding a victim wireless device. Dummy bit locations may be determined by applying the inverse of the mapping performed by interleaver shifter 1204 to the locations of the notch subcarriers in a symbol. This may be the same mapping used by a deinterleaver deshifter block in a receiver. In some embodiments, the inverse interleaver shifter mapping is stored in a lookup table (LUT). A LUT may be implemented in a number of ways, including Random Access Memory (RAM) and random logic.

Data bits may arrive from MAC interface 1206 at a reduced rate compared to when no bit loading is performed. Since bits coming from MAC interface 1206 are distributed over more symbols, some blocks in transmitter 1200 may run at a reduced processing rate. After the insertion of dummy bits by insert dummy bits block 1202, the number of bits passing through transmitter 1200 may be back to normal and the rest of transmitter 1200 may operate at a normal processing speed. In this embodiment, the insertion of dummy bits is performed prior to interleaving and shifting. In some embodiments, dummy bits are inserted at another point in the path of transmitter 1200.

In some embodiments, a transmitting wireless device communicates information associated with a bit loading process to a receiving wireless device. A receiving wireless device may use this information to process a received frame. Bit loading information may be communicated in variety of ways. In some embodiments, multiple frames are transmitted with the same bit loading processing performed on them. A frame may be used to communicate this information and subsequent frames processed with that particular bit loading are transmitted. If a transmitter changes the bit loading process (e.g., because the notch subcarriers change) another frame may be transmitted with the new bit loading information. Frames such as beacon frames or a frame dedicated to communicating bit loading information may be used.

Figure 13:
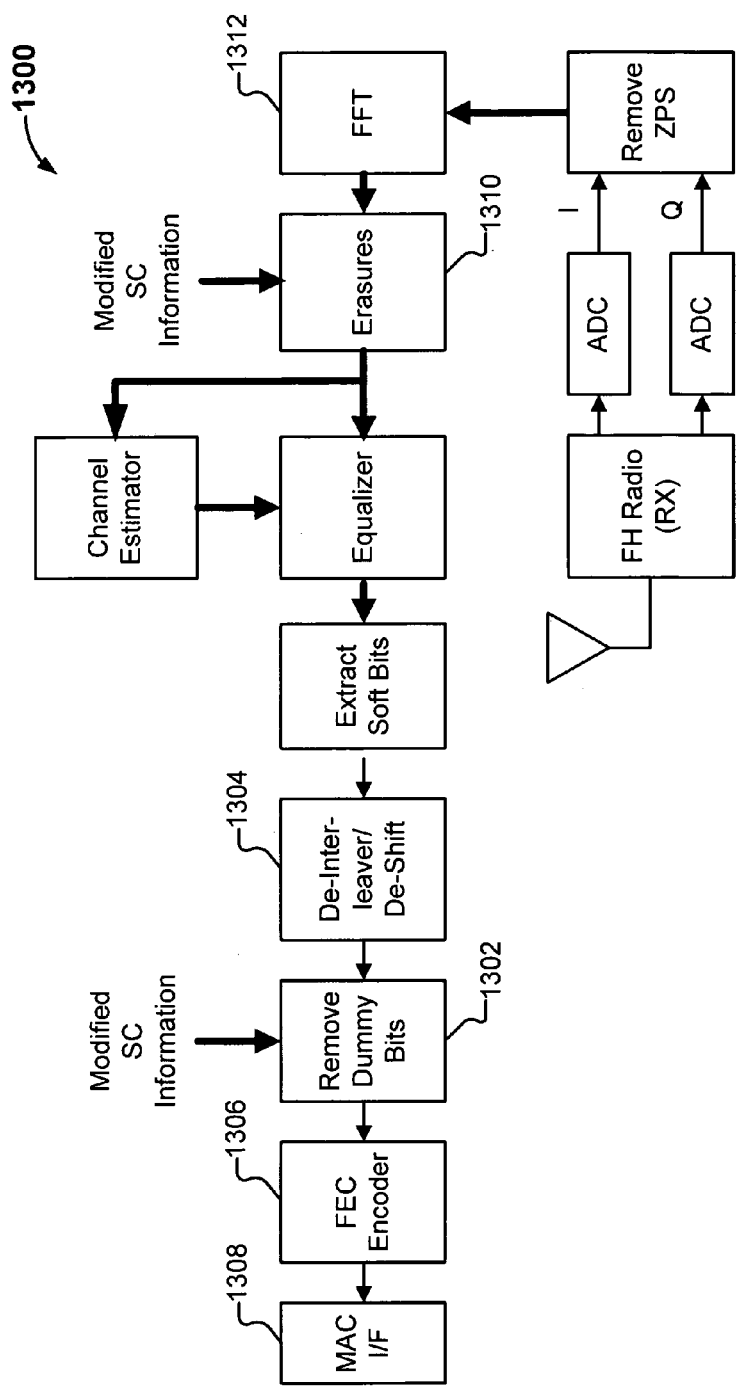
FIG. 13 is a block diagram illustrating an embodiment of a receiver of a wireless device configured to perform bit loading.

FIG. 13 is a block diagram illustrating an embodiment of a receiver of a wireless device configured to perform bit loading. In the example shown, receiver 1300 may be included in a PHY module and a radio module, such as PHY module 204 and radio 206 in FIG. 2.

Soft bits associated with blank subcarriers are removed by remove dummy bits block 1302 from the data output by deinterleaver deshifter 1304. These soft bits correspond to the dummy bits inserted by the transmitter into notch subcarriers. The locations of the dummy bits may be calculated by applying the deinterleaver deshifter mapping to the locations of the blank subcarriers in a symbol. The locations of the blank subcarriers may be communicated by the transmitter of a frame to receiver 1300. In some embodiments, this information is contained in the header of a frame.

Receiver 1300 operates at normal processing speed until the output of deinterleaver deshifter 1304. At remove dummy bits block 1302, soft dummy bits are removed, which reduces the processing speed through FEC decoder 1306 and MAC interface 1308. In this embodiment, erasure block 1310 erases samples associated with notch subcarriers output by FFT 1312. In some embodiments, receiver 1300 is capable of performing bit notching or bit loading. Receiver 1300 and receiver 100 may contain the same blocks except for remove dummy bits block 1302. A mode setting may be used to configure receiver 1300 in a bit notching mode, a bit loading mode, or a normal mode.

Modified subcarrier information may be obtained from a variety of sources. In some cases, the particular bit loading processing used may vary relatively infrequently. For example, a victim wireless device may change bands relatively infrequently and the notch subcarriers may be relatively stable. Modified subcarrier information may be obtained from an interference mitigation controller that stores interference mitigation information. In some cases, the bit loading process performed by a transmitting wireless device on received frames varies relatively frequently. For example, the bit loading process used may vary on a frame by frame basis. A block in receiver 1300 may extract bit loading information from the header of each frame and pass this information to blocks that use this information, such as remove dummy bits block 1302 and erasure block 1310.

The above figures illustrate some transmitter and receiver embodiments configured to process notch subcarriers. In some embodiments, lining subcarriers are used in addition to notch subcarriers. The embodiments described above may be modified appropriately to support the use of lining subcarriers. For example, a transmitter may be configured to adjust the amplitude or phase of data mapped to a lining subcarrier. A receiver may perform appropriate processing of data in a lining subcarrier. For example, a receiver may process data in lining subcarriers the same way it processes data in notch subcarriers. In some embodiments, a receiver is unaware that lining subcarriers are used.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for transmitting information, including:
   receiving, at a first wireless device, interference mitigation information associated with mitigating interference with a victim wireless device transmitted from a second wireless device;
   determining, at the first wireless device, whether to transmit a copy of the interference mitigation information based at least in part whether a count has exceeded a limit; and
   in the event it is determined to transmit, transmitting from the first wireless device to a third wireless device the copy of the interference mitigation information.

2. A method as recited in claim 1, wherein an Ultra Wideband (UWB) wireless device performs the method.

3. A method as recited in claim 1, wherein the victim wireless device includes a narrowband wireless device.

4. A method as recited in claim 1, wherein the interference mitigation information includes at least one of the following:

information associated with a detection parameter, information associated with a detection result, or information associated with a modified subcarrier.

5. A method as recited in claim 1, wherein transmitting includes using a distributed protocol.

6. A method as recited in claim 1 further including:
receiving the interference mitigation information at a receiving wireless device; and
storing the interference at the receiving wireless device.

7. A method as recited in claim 1 further including receiving the interference mitigation information at a receiving wireless device, wherein the interference mitigation information is used by the receiving wireless device to coordinate a detection process.

8. A method as recited in claim 1 further including receiving the interference mitigation information at a receiving wireless device, wherein the interference mitigation information is used by the receiving wireless device to determine a notch subcarrier.

9. A method as recited in claim 1 further including determining whether to transmit a piece of interference mitigation information.

10. A method as recited in claim 1, wherein the count includes a hop count that increments in the event a copy of the interference mitigation information is transmitted to another wireless device and the limit includes a hop limit.

11. A method as recited in claim 1, wherein the count includes a time count and the limit includes a time limit.

12. A method as recited in claim 1, wherein a frame is used in transmitting the interference mitigation information.

13. A method as recited in claim 1, wherein a frame is used in transmitting the interference mitigation information, including at least one of the following: a header of the frame or a beacon frame.

14. A computer program product for transmitting information, the computer program product being embodied in a computer readable medium and comprising computer instructions for:
receiving, at a first wireless device, interference mitigation information associated with mitigating interference with a victim wireless device transmitted from a second wireless device;
determining, at the first wireless device, whether to transmit a copy of the interference mitigation information based at least in part whether a count has exceeded a limit; and
in the event it is determined to transmit, transmitting from the first wireless device to a third wireless device the copy of the interference mitigation information.

15. A computer program product as recited in claim 14, wherein transmitting includes using a distributed protocol.

16. A computer program product as recited in claim 14, wherein the interference mitigation information includes at least one of the following: information associated with a detection parameter, information associated with a detection result, or information associated with a modified subcarrier.

17. A computer program product as recited in claim 14, wherein the count includes a hop count that increments in the event a copy of the interference mitigation information is transmitted to another wireless device and the limit includes a hop limit.

18. A computer program product as recited in claim 14, wherein the count includes a time count and the limit includes a time limit.

19. A system for receiving information, including:
a processor; and
a memory coupled with the processor, wherein the memory is configured to provide the processor with instructions which when executed cause the processor to:
receive, at a first wireless device, interference mitigation information associated with mitigating interference with a victim wireless device from a second wireless device;
determine, at the first wireless device, whether to transmit a copy of the interference mitigation information based at least in part whether a count has exceeded a limit; and
in the event it is determined to transmit, transmit from the first wireless device to a third wireless device the copy of the interference mitigation information.

20. A system as recited in claim 19, wherein the interference mitigation information includes at least one of the following: information associated with a detection parameter, information associated with a detection result, or information associated with a modified subcarrier.

21. A system as recited in claim 19, wherein the count includes a hop count that increments in the event a copy of the interference mitigation information is transmitted to another wireless device and the limit includes a hop limit.

22. A system as recited in claim 19, wherein the count includes a time count and the limit includes a time limit.

* * * * *